United States Patent Office 3,073,213
Patented Jan. 15, 1963

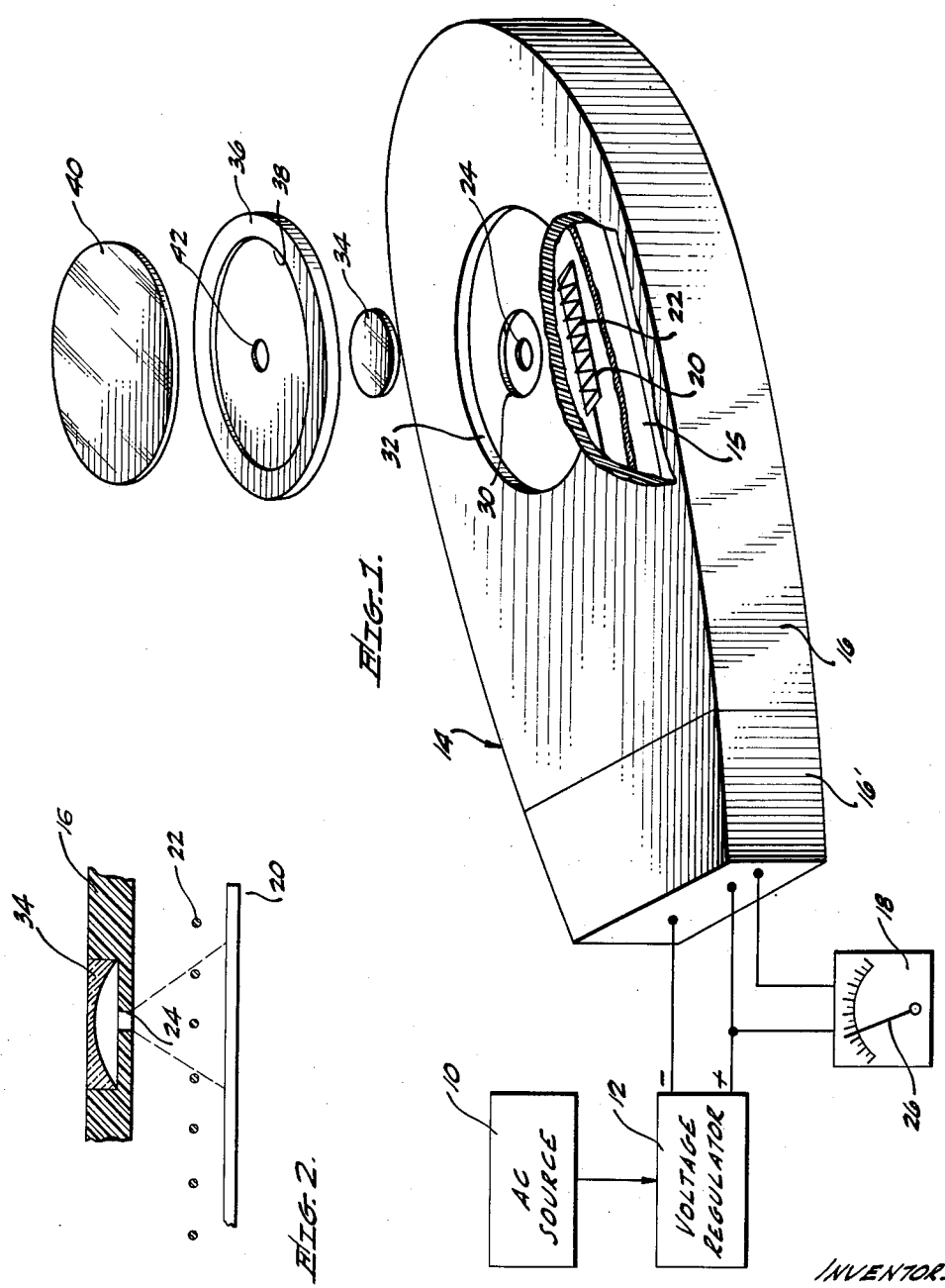

3,073,213
MEANS FOR MEASURING PROPERTIES
OF LIGHT
Walter E. Garrigus, Los Angeles, and Murray Axelrod, Canoga Park, Calif.; said Axelrod assignor to said Garrigus
Filed Mar. 28, 1958, Ser. No. 724,705
5 Claims. (Cl. 88—23)

This invention relates to light detecting and measuring apparatus, and more particularly to improved means for measuring illumination and color temperature, which is suitable for use in enlarging or printing photographic negatives to obtain high quality enlargements or prints.

In the enlargement of photographic negatives to obtain an enlarged picture, whether in a black and white or in a color process, it is well known that considerable time is consumed in experimentation to obtain an enlargement or print of good quality. In black and white and in certain color processes, the operator generally has to make several enlargements by a trial and error method before he gets the proper relationship between the contrast of the negative and the grade of paper having complementary contrast characteristics. In other color processes, several enlargements must be made, also as a result of experiment, before the correct exposure and filter selection for color temperature correction are determined.

In black and white processes it takes ten to fifteen minutes to develop a single enlargement, and upwards of an hour is needed to develop a single color enlargement. Since the process must be repeated several times before a good enlargement is obtained, the time needed to make an acceptable enlargement may be from several hours to half a day for black and white, and from several days to a week for color.

Whatever the process, it involves expenditure of considerable time, effort and materials, all of which makes the process unduly expensive, and all of which could be avoided by knowing initially the correct paper grade, exposure time, and (when required) filter for obtaining a high quality enlargement.

The aforementioned requisites for a high quality enlargement are also the same for a high quality print.

It is therefore an object of this invention to provide a means whereby a high quality enlargement or print can be obtained from a photographic negative or color transparency on the first attempt.

It is another object of this invention to provide a novel means for determining the necessary criteria for obtaining a high quality enlargement or print in photographic processes.

Still another object of this invention is to provide a novel means for measuring the contrast of a photographic negative.

A further object of this invention is to provide a unique light detector device for measuring illumination from, and color temperature of, a light source.

It is yet another object of this invention to provide a novel means for measuring the spectral distribution of a source of light.

The above and other objects and advantages of this invention will become apparent from the accompanying drawing illustrating a preferred embodiment thereof. The scope of the invention is pointed out in the appended claims. In the drawing, FIG. 1 is an exploded view of the parts of an instrument for measuring the properties of light, and a block diagram of a circuit therefor, in accordance with this invention, and FIG. 2 is a sectional view of a portion of the instrument of FIG. 1 to aid in explaining the operation of this invention.

Referring to FIG. 1, numeral 10 indicates a source of alternating voltage, which may be a conventional 60-cycle line voltage source. A voltage regulator 12, which may be one of many conventional regulators, is connected to the source 10 to provide a D.-C. output voltage. The regulator 12 is connected to a light detector 14 having a photosensitive device, illustrated as a photomultiplier tube 15, in the housing 16 thereof. An indicator 18 is connected in circuit with regulator 12 and the tube 15.

It will be apparent that any source of constant D.-C. voltage may be employed, and that the A.-C. source and regulator above described are illustrated only.

The tube 15 is a conventional photomultiplier tube, the operation of which is described in the publication, "Journal of the Optical Society of America," June 1947, by R. W. Engstrom. As there explained, the current multiplication in the tube will be reduced 45–50% for a ten percent reduction in the energizing voltage; therefore, and for the purpose of this invention, the regulator 12 insures that the voltage applied to the tube is substantially constant.

The light-sensitive electron emitter element is indicated at 20, and the grid shielding it is indicated at 22. The tube 15 is located in housing 16 so that the electron emitter 20 lies perpendicular to the axis of a small opening 24, e.g., $\frac{1}{32}''$ in diameter, in the housing 16. In this manner, light flux entering the opening 24 will impinge upon electron emitter 20 to establish through the indicator 18 a current corresponding to the light flux.

The housing 16 preferably is lightweight for ease in handling, and for this purpose may be made of a suitable plastic material, as indicated. Additionally, the housing is designed to exclude all light from its interior with the exception of that which enters the small opening 24 therein. In this latter connection, the main body of the housing in which the tube 15 is inserted is closed at one end (the end adjacent the opening 24), with the pins of the tube (not shown) protruding through the other end. A cap 16' containing the tube socket fits snugly over such other end, and leads from the regulator 12 and indicator 18 extend through the cap for connection through the socket to appropriate tube pins. Such connections are of course conventional.

The indicator scale is calibrated to a desired standard of light measurement, e.g., foot candles, meter candles, or lumens per square foot, as used in photographic processes. It will be apparent, however, that readings on any desired scale may be provided.

The small opening 24 is in the center of a small recess 30, which is itself in the center of a larger recess 32. The recess 30 is shaped to receive a lens element 34, and an opaque disc element 36 fits in the recess 32. The disc 36, which may be a light plastic material, is preferably light in color, e.g., white, to facilitate visual "light finding." The disc 36 is also provided with a recess 38 to receive a filter element 40, and an opening 42 is provided in the center of disc 36 to permit light passing through the filter 40 to enter the opening 24. However, it will become apparent that the recess 38 may be eliminated and the filter placed on the upper surface of the disc. Further, one or more filter elements may be used, as will be readily apparent. Such filters may be conventional color filters, the use of which will be explained more fully hereinafter.

In developing black and white and certain color prints, papers of different contrast characteristics are commercially available. Ordinarily the operator will place the negative in the enlarger and select a paper on which to make the print. From the first print it is seen whether the exposure was proper, and an estimate is made of the contrast of the negative and the paper having complementary contrast characteristics. A paper is chosen which it is believed might have the proper contrast characteristic and a new print made thereon. This process of trial and error is repeated until a good print is finely obtained.

In accordance with this invention, and with the filter 40 removed, the light detector 14 is placed on the support or easel (not shown) on which the enlargement of the negative is projected. The detector is moved about and held in the positions where the lightest and darkest portions of the negative are projected. Determination of these two positions is facilitated by the light colored disc 36. Being light in color, it provides a background against which an observer has no difficulty in ascertaining the portions of greatest lightness and darkness. As is apparent, in order that the light color of the disc aid in locating the opening 24 at these contrasting light portions, the housing 16 should be darker in color than the disc 36, e.g., black for the housing 16 and white for the disc 36.

The two readings thus obtained on the indicator 18 reveal the density scale of the negative, and from this information the paper with complementary contrast characteristic is selected, as by reference to standard comparison charts. The speed, S, of the particular paper is also known, being expressed on such charts, or in printed matter accompanying the paper, as printing indices. The formal expression for paper speed is:

$$S = \frac{10,000}{TE}$$

where T is the exposure time, in seconds, required for the paper, and E is illumination expressed in meter-candles.

The exposure for the paper is related to the paper speed and the illumination from the lightest portion of the negative, as revealed by the higher of the two readings above mentioned. This relationship is expressed as:

$$T = \frac{10,000}{ES}$$

The exposure can be computed by inserting the appropriate values in this last expression and solving for the exposure time.

With the determination of the proper paper grade and also exposure time, all the requisite information is complete for obtaining a high quality print on the first attempt. Furthermore, this information can be obtained in a minimum of time, e.g., less than five minutes, in sharp contrast to the time used for experimentation of the type heretofore followed. Therefore, this invention effects an enormous saving of time, effort and materials in making photographic enlargements or prints, all of which can be devoted to doing a greater amount of such work in less than the time heretofore required, and in less time than has heretofore been possible.

To insure that the light entering the opening 24 covers a sufficient area of the emitter 20 to result in a more reliable reading, the lens 34 is the type which diffuses light passing through it. For this purpose, the lens may be plano-concave, as shown in FIG. 2, or it may be of any configuration, e.g., convex-concave, suitable for diffusing light.

The reason for diffusing the light entering the opening 24 is to minimize the shadowing effect of the wires making up the grid 22. Referring to FIG. 2, it will be apparent that if the light entering the opening was columnar, a grid wire disposed between the opening 24 and emitter 20 would create too much shadow to permit reliable readings to be obtained. The diffusion of light over a large area of the emitter greatly minimizes shadow effects, whereupon the indicator 18 will accurately reflect the light flux entering the opening 24. Of course, another expedient would be to carefully position the tube 15 in the housing so that no grid wire is directly between the opening 24 and emitter 20; in such case, the lens may be dispensed with.

Where required by the photosensitive device, no lens need be employed; alternatively, and depending upon the photo-sensitive device, a converging type lens may be needed. From the foregoing, it will be seen that the "pinhole" character of the opening 24, the color contrast between the disc 36 and the housing 16, the photo-multiplier 15, and the indicator 18 all cooperate to make our device uniquely effective for the desired purpose, i.e., determination, in a minimum of time, of the portions of a negative that are of greatest lightness and darkness. Prior art light measuring devices are not conducive to such determination with the speed permitted by our invention.

In some color processes only one type of paper is used, i.e., the paper has only one contrast characteristic. However, an additional problem in making a color print is posed by the temperature of the light source used in the enlarger. As is well known, the temperature of a light source determines its spectral distribution characteristic.

There is only one temperature that is exactly right for the particular negative from which an enlargement or print is to be made. However, this ideal temperature rarely exists, and correction is required to compensate for the deviation from the correct spectral distribution before a good color print can be obtained.

Color temperature correction is normally effected by the use of filters. A filter must be placed between the light source and the negative which will insure the proper spectral distribution. The procedure for obtaining the proper filter involves more experimentation: the operator first makes a print, which usually has an improper color content, e.g., too blue. From this print a new exposure is estimated, and a new filter is selected which will soften the blue portion of the spectrum. Another print is made, and although the blue is softened, the print may be too yellow; hence another exposure time and filter choice must be used. This process usually must be repeated several times before the proper combination is arrived at.

In accordance with this invention, the filter 40 is placed on the disc 36 and the detector 14 located beneath the light source. The filter is designed to pass only a very narrow portion of the light spectrum. With the filter in place, a reading is obtained on the indicator of the light flux emitted by the light source as to that portion passing through the filter. The filter is then replaced with another and similar filter, which is similarly selective but to a different portion of the spectrum, and a corresponding indication is obtained.

From these two readings, the spectral distribution curve of the particular source is known, from Wien's displacement law: from the ratio of energy density at two selected wavelengths of a particular spectrum, the associated spectral distribution curve can be identified. Further, since the temperature of a source determines its spectral distribution curve, the temperature of the source is known.

From this known temperature, the proper filter for the temperature correction needed is also identifiable. Upon placing such filter between the source and the negative, all that remains is the determination of the proper exposure, in which case the procedure heretofore explained for black and white processes is followed.

However, where only one type of paper is used, its speed is known. Therefore, to complete the information needed, the light detector is positioned to obtain an indication of the lightest point, which is the highest reading, following which the exposure is determined from the relationship previously explained. As with black and white prints, the determination of the proper filter for color temperature correction, and of the exposure needed, requires no more than five minutes.

It should be noted that the light detector of this invention is not limited to use in a photographic process, but may be used to determine properties of light from any light emitting or reflecting body or surface.

Although it has been pointed out that the lightest portion of a negative is employed to determine the proper paper speed and exposure for making an enlargement or print, it will be apparent that the darkest portion may also be used for this purpose. Further, where desired the instrument of this invention can be used in the manner described to determine the density scale for a portion of the negative, and therefrom enhance that portion by selecting the paper having the proper contrast characteristic for the purpose.

What is claimed is:
1. A light detecting instrument comprising:
   a light-tight, portable, hollow housing having thin, parallel walls closely spaced so that the housing is flat, one of said walls having a double recess wherein a pinhole-like opening extends from the inner recess to the interior of said housing;
   a lens device nested in said inner recess and covering said opening for effecting a divergence of light passing through said lens device and said opening into said housing;
   an opaque element lighter in color than said housing nested in the outer recess and covering said lens device, said opaque element having a central opening smaller in diameter than said lens device and at least as large in diameter as said pinhole-like opening, said opaque element by virtue of its color contrast with the housing permitting, upon moving the housing over a plane in which light varies, visual detection to locate the pinhole-like opening at the lightest and darkest portions of light in the plane;
   a photosensitive device fixed in said housing having a light-sensitive element extending across the axis of and adjacent to said opening;
   and means externally of said housing and coupled to said photosensitive device to develop a visual indication for any quantity of light flux entering said opening and striking said light-sensitive element.

2. A light detecting instrument as defined in claim 1, wherein said opaque element has a recess, the opening in said opaque element being centered with respect to said recess; and a color filter removably nested in the recess in said opaque element.

3. A light detector comprising:
   a light-tight, portable hollow housing having parallel walls closely spaced so that said housing is flat, one of said walls having a recess therein, said one wall having a pinhole-like opening centered in said recess and extending to the interior of said housing said housing having a segment surrounding said recess that is light in color compared to the color of the rest of the housing, said segment by virtue of such color contrast facilitating, upon moving the housing in a plane in which light varies, visual detection and location of the pinhole-like opening at the lightest and darkest portions of light over the plane;
   a lens element removably nested in said recess and covering said opening so as to effect a predetermined divergence of light flux entering said housing through said opening;
   a photoelectric device having a light-sensitive element extending across the axis of and disposed adjacent to said opening;
   and means externally of said housing and coupled to said photoelectric device for developing an observable indication of any quantity of light flux entering said opening and striking said light-sensitive element, whereby both the light color of said segment and the observable indications function to enable one to determine the points of lightest and darkest portions of light in the plane in a minimum of time.

4. A light detector as defined in claim 3, wherein said housing has a second recess in which said first-mentioned recess is located, wherein said segment is an opaque element nested in said second recess.

5. A light detector as defined in claim 3, wherein said segment has a recess therein; and a color filter removably nested in the recess of said opaque element.

References Cited in the file of this patent
UNITED STATES PATENTS

| | | |
|---|---|---|
| 1,913,719 | Nauman | June 13, 1933 |
| 1,990,361 | Bailey | Feb. 5, 1935 |
| 2,101,710 | Huber | Dec. 7, 1937 |
| 2,293,425 | Dammond | Aug. 18, 1942 |
| 2,401,691 | Luboshez | June 4, 1946 |
| 2,475,108 | Nicholson | July 5, 1949 |
| 2,522,987 | Buck | Sept. 19, 1950 |
| 2,529,975 | Smith | Nov. 14, 1950 |
| 2,571,697 | Evans | Oct. 16, 1951 |
| 2,584,440 | Fogle | Feb. 5, 1952 |
| 2,590,165 | Fairbank et al. | Mar. 25, 1952 |
| 2,598,783 | Gittus | June 3, 1952 |
| 2,749,799 | Strem | June 12, 1956 |
| 2,926,562 | Bretthauer et al. | Mar. 1, 1960 |
| 2,986,065 | Newman | May 30, 1961 |

FOREIGN PATENTS

| | | |
|---|---|---|
| 472,147 | Great Britain | Sept. 17, 1937 |